United States Patent [19]

Bohm et al.

[11] Patent Number: 4,776,909

[45] Date of Patent: Oct. 11, 1988

[54] METHOD FOR MAKING COEXTRUDED SEAMLESS TUBULAR TIRE BODIES FOR USE IN PNEUMATIC TIRES

[75] Inventors: Georg G. A. Bohm, Akron; Thomas W. Bell, Mogadore, both of Ohio

[73] Assignee: The Firestone Tire & Rubber Company, Akron, Ohio

[21] Appl. No.: 890,058

[22] Filed: Jul. 28, 1986

[51] Int. Cl.[4] .................. B29D 30/00; B29C 47/02; B29C 47/06

[52] U.S. Cl. .................. 156/117; 156/123; 156/126; 156/133; 264/173; 264/174

[58] Field of Search ........... 156/123, 124, 126, 130.7, 156/132, 133, 135, 401, 117; 152/510, 525, 564; 264/173, 174; 425/114, 133.1

[56] References Cited

U.S. PATENT DOCUMENTS

| | | | |
|---|---|---|---|
| 2,874,411 | 2/1959 | Berquist | 18/13 |
| 3,143,449 | 8/1964 | Bosomworth et al. | 156/126 |
| 3,183,135 | 5/1965 | Berquist | 156/117 X |
| 3,508,595 | 4/1970 | Wilson | 152/525 X |
| 3,615,987 | 10/1971 | Blatz et al. | 156/133 |
| 4,004,627 | 1/1977 | Sandstrom et al. | 152/525 X |
| 4,050,867 | 9/1977 | Ferrentino et al. | 425/114 |
| 4,051,083 | 9/1977 | Newman | 260/5 |
| 4,283,241 | 8/1981 | Hollmann | 156/117 |
| 4,328,133 | 5/1982 | Ogawa et al. | 524/505 |
| 4,359,354 | 11/1982 | Bohm | 156/123 X |
| 4,365,659 | 12/1982 | Yoshida et al. | 152/354 R |
| 4,400,488 | 8/1983 | Lal et al. | 525/211 |
| 4,484,966 | 11/1984 | Kawamoto | 156/133 X |
| 4,578,024 | 3/1986 | Sicka et al. | 425/114 |
| 4,584,038 | 4/1986 | Enders | 156/132 |

FOREIGN PATENT DOCUMENTS

| | | |
|---|---|---|
| 2433779 | 1/1976 | Fed. Rep. of Germany . |
| 59-20708 | 2/1984 | Japan . |
| 2050933 | 1/1981 | United Kingdom . |

*Primary Examiner*—Michael W. Ball
*Assistant Examiner*—Ramon R. Hoch
*Attorney, Agent, or Firm*—Daniel N. Hall

[57] ABSTRACT

Coextrusion from rubber of hollow tubular structures with filament reinforcement provides composites which can be formed into spliceless bodies for pneumatic tires. The composites can be formed from one, two, three or more rubber stocks and have portions or layers which can form the body plies, sidewalls, innerliners, stabilizer ply inserts and, optionally, abrasion gum strips of tire bodies. Tires made from the bodies formed from coextruded composite structures of this invention are seamless and more uniform than those made from convention tire structural components.

14 Claims, 7 Drawing Sheets

METHOD FOR MAKING COEXTRUDED SEAMLESS TUBULAR TIRE BODIES FOR USE IN PNEUMATIC TIRES

This invention relates to coextruded spliceless rubber tire bodies, their manufacture and their use in the production of pneumatic tires, especially in radial tires for passenger cars and light trucks. Specifically, it relates to filament reinforced tubular coextrudates and structures having no splices or seams which can be used as components for constructing pneumatic tires and more particularly, to simple efficient methods of manufacturing spliceless tire bodies of improved uniformity and durability.

BACKGROUND

Pneumatic tires are constructed out of a number of different rubber and metal components. In conventional tire construction, the rubber parts are often in sheet form and are wound or placed around the tire building drums after being cut and then spliced to form a continuous tubular or annular structure around the drum. In other words, the sheet component, after being bias cut, is usually wrapped around the drum and the overlapping ends of the sheet joined to produce axially extending seams. Such seams are generally undesirable in that they produce a discontinuity in the annular construction which results in weak spots which are more susceptible to failure than other parts of the tire. Leakage at poorly bonded seams can allow moisture and reactive gases (such as oxygen) into the tire which can lead to corrosion of the steel reinforcing filaments and separation of the tire plies. Ultimately such deterioration will result in failure of the tire. The seams inherent in conventional tire construction may produce bumps or undulations in the sidewall surface. These imperfections are thought by some to be objectionable for aesthetic or marketing reasons. At the same time, the presence of such seams inherently results in structural asymmetry in the finished tire which manifests itself as variations of radial and lateral forces and other non-uniform parameters. Such variations need to be minimized to meet current automobile maufacturer specifications. In the extreme, the imbalance induced by structural asymmetry of a spliced tire can cause premature tire failure under severe service conditions. Modern, efficient high speed methods of tire curing favor bladderless curing. The absence of bladders in bladderless curing exposes the tire interior to the expanding medium (usually air, steam or nitrogen) which may infiltrate the tire's structure through seams and weaken its structure. At the same time, in bladderless curing the seams are not flattened or soothed out. Their appearance has been found by some to be objectionable from aesthetic or marketing aspect. The coextruded, seamless tire bodies of the present invention obviate these problems and permit bladderless curing without incurring these detriments.

Still further, the coextruded tubular spliceless tire body manufacturing techniques of this invention reduce the need for manufacture and assembly of individual tire structural components such as tire body plies, air sealing innerliners, sidewalls, reinforcing strips and other various components. This is because the process of this invention allows several conventional tire components to be simultaneously made and incorporated into a tubular composite structure. Thus tires made by conventional hand assembly techniques can be more costly and less uniform than those made by the practice of this invention using coextruded seamless tubular tire bodies.

It is an object of the present invention to reduce or substantially eliminate many, if not all of the aforementioned difficulties and problems in conventional tire manufacture and assembly methods.

It is also an object of this invention to provide coextruded tire bodies embodying in a single structural composite several conventional tire structural components. Other objects will become apparent from study of this specification and the accompanying claims.

BRIEF DESCRIPTION OF THE INVENTION

According to the present invention, a tubular, spliceless, hollow structure is extruded of compounded rubber formulations containing fillers such as carbon black and/or silica and other conventional additives and curatives. The structure is then cut or sectioned in a manner perpendicular to its principal axis to form a coextruded tire body or carcass comprising in the composite one or more conventional tire components. The compounded rubber formulations used are based on natural rubber or synthetic rubber. Most typically they are based on mixtures of natural and synthetic rubber as more fully described and exemplified below. In some instances, the rubber compound formulations used in this invention resemble or are essentially the same as those used in conventional tire construction methods. In many other instances, rubber compound formulations especially adapted to the coextruded composite tire bodies and manufacturing techniques of this invention are used. This is particularly true where a number of conventional tire components are combined in a single coextruded structure.

The sectioned coextruded tire body composite is positioned on a tire building drum and assembled together with other separately formed tire components, as needed, to produce a complete green tire assembly ready for molding and curing. Reinforcing filaments, in the form of yarns, cords or wires, of metal, glass or suitable polymeric materials are generally coextruded with the rubber compounds in the tubular hollow structure and thus are present as continuous reinforcement in the tire body component. Thus the techniques of the present invention are useful in producing filament reinforced structures. These inventive techniques can also be used to make non-reinforced structures. In many embodiments of the invention, appropriate portions of the coextruded structure (such as the body ply) are reinforced while other portions (such as the innerliner) are not. The flexibility in introducing reinforcement where desired is an advantage of the invention. The tubular spliceless tire body components of the present invention may also be coextruded from a single rubber feed stock or two or more stocks. Their thickness and shape may be varied so as to provide integral segments or portions which can replace or assume the function in the tire of such conventional tire components or structural elements as the innerliner, sidewall, stabilizer ply insert and other desired components. The process and techniques of this invention can be readily adapted to the production of different sized tire bodies by varying the length of the coextrudate along its major axis and the distribution and thickness (gauge) of various layers or plies. The latter changes can be readily implemented by controlled movement of certain coextrusion die elements and other process parameters.

PRIOR ART

The extrusion of components in tubular form for use in the assembly of pneumatic tires is known to the art. For example, U.S. Pat. No. 3,615,987 to Blatz describes a method for manufacturing annular seamless components of rubber or plastic materials comprising coextruding a tube of same, cutting the extruded tube and positioning lengths on to a tire building form. Blatz further describes the manufacture of annular seamless sidewall components in a separate step and their ensuing incorporation in an assembled pneumatic tire. In Blatz, said cylindrical sidewall rubber components after manufacture are positioned onto the mounted extruded tire body, together with bead wires and tread rubber and then shaped into the toroidal form of a completed, uncured or green tire.

U.S. Pat. No. 4,578,024 to Sicka and Tompkins, describes an apparatus and method for preparing annular seamless components of reinforced elastomeric material which are useful as plies in the construction of pneumatic tires, particularly as body plies for radial tires. The annular components produced by the Sicka-Tompkins process generally include only the tire body ply portion of the tires and do not include, for example, innerliner or sidewall portions. In Sicka and Tompkins, these portions must be formed separately and then combined with the carcass and other second stage components to produce the desired, completed green tire assembly ready for curing, molding and vulcanization.

Thus, Sicka and Tompkins described one stage or step of a complex multistage process for tire assembly. In this stage a tire body is extruded. It is then placed on a building drum and then individual components such as innerliner, sidewall plies and optional stabilizer ply insert (SPI) are combined along with the bead filler and abrasion gum strip (AGS). These parts must be individually positioned and bonded. Clearly extreme care is required to insure that these steps are carried out properly. In contrast, the manufacturing process of the present invention represents a compression and reduction of the number of stages typically found in the aforedescribed conventional manufacturing technology. The coextrusion step provides a composite combining the innerliner, body ply, sidewall plies and, optionally, SPI and/or AGS elements. Thus, the coextrusion technique of this invention reduces the number of individual components and assembly steps necessary to prepare a tire body which can be subsequently combined with the belt plies and tread to form the finished green tire ready for molding and curing.

The '024 patent contains a description of other prior art in the form of patents which generally relate to the extrusion of tubular tire plies or bodies, some of which are filament reinforced. Therefore, this description from the '024 specification is hereby incorporated by reference for its disclosures in this regard.

Other U.S. patents relating to extrusion of tire structural components include 2,874,411 and 3,183,135 (both to Berquist); 3,143,449 (Bosomworth, et al); 4,283,241 (Hollmann); 4,359,354 (Bohm) and 4,484,966 (Kawamoto).

DISCUSSION OF THE INVENTION

According to the present invention, a coextruded, hollow tubular rubber structure or coextrudate, suitable for forming a seamless pneumatic tire body component by sectioning in a plane perpendicular to the structure's main axis, is formed by continuous coextrusion. Said structure comprises a first continuous, filament-reinforced layer, the R-I layer, formed by coextrusion of an elastomeric composition, $R_1$, and reinforcing filaments of metal, glass or suitable polymeric material oriented parallel to the structure's main axis. The R-I (body ply) layer reinforced with cord can also be suitable for shaping into the sidewall portion of the tire or for functioning as the innerliner. In one embodiment the R-I layer can, if made of the appropriate rubber formulation, function as the body ply and sidewall. If suitably composed, shaped and positioned under the tread, it can also serve as the SPI.

In one aspect of the invention, the aforedescribed coextruded structure also comprises a second rubber layer, the R-II layer concentrally deposed on the the inside of the first layer and composed of an elastomeric composition $R_2$. The R-II layer is coextruded with the reinforced R-I layer and may be continuous or discontinuous with it. In a typical embodiment, the R-II layer forms or functions as the innerliner or air barrier element of the shaped tire. The composition of the R-II layer can be varied as desired. In some intances, the $R_1$ rubber composition (without cord reinforcement) is used. In this case there is a cord reinforced zone R-II without a phase boundary between them. In other embodiments, the R-II layer is made of a different rubber composition, $R_2$. The $R_2$ composition may contain some of the same components of $R_1$ (such as, for example, natural rubber) or it may be based on a totally different type of rubber. Similarly some or even all other fillers and additives in $R_1$ may also be in $R_2$ or one or all may be omitted or replaced by other materials.

In still another aspect of the invention, there is present a third rubber layer, the R-III layer, concentrically deposed to the exterior of the first layer. This R-III layer may be composed of the $R_1$ composition (without reinforcing cords), or it may be of a third composition, $R_3$. The R-III layer is coextruded with the R-I layer, and, if present, the R-II layer. This third R-III layer is usually discontinuous and of varying wall thickness. Typically it functions as the sidewall structural element of the tire. It can also function as an SPI if appropriately composed, shaped and positioned. Ultimately it forms or functions as the sidewall portion of the shaped tire. Additional coextruded layers or plies, continuous or discontinuous with the first layer or ply, and of constant or varying wall thickness may also be formed as desired.

As is apparent from the above description, the layers R-I, R-II, and R-III (and R-IV if present) can be of the same or different rubber compositions (including fillers such as carbon black and chemical additives). While they are described above as distinct and separate layers for clarity of understanding, in reality, when the compositions of R-I, R-II or R-III are the same or substantially similar, separate or distinct layers are obscured because phase boundries merge and disappear. In this case it may be more accurate to term the "layers" as zones of a single layer of substantially the same rubber composition. One can then refer to the reinforced zone, R-I, the inner zone R-II and so forth. It is also possible that layers or zones of the same rubber composition are coextruded through different flow channels and different extrusion die portions of the coextrusion head.

The invention also comprises a method of manufacturing a pneumatic tire body component made of at least one or more plies or layers which comprises the steps of:

(a) coextruding from a rubber composition, a filament reinforced seamless hollow tubular extrudate having a first layer R-I and filament reinforcement contained therein, said filaments substantially parallel to the main axis of the tubular body; and optionally other plies or layers R-II, R-III and R-IV of the same or different rubber compositions;

(b) sectioning the tubular extrudate in a plane substantially perpendicular to its main axis to form a hollow tubular tire body component;

(c) positioning said component concentrically on a tire assembly drum containing shaping or turn-up bladders, or mechanical means of expansion, said drum optionally having two AGS and, optionally, two separately formed sidewall strips concentrically positioned on it under said tubular component if the AGS and/or sidewall strips are not part of the tubular extrudate;

(d) positioning two bead assemblies comprised of bead wires and fillers over the tubular component;

(e) turning up both ends of said hollow component with said bladders or mechanical means of expansion so as to enclose the bead assemblies with a portion of the structure and the abrasion gum strip;

(f) expanding the center of the structure so as to form a toroidally-shaped pneumtic tire body component.

In certain embodiments of the tire construction process, the inflation step (f) is carried out by surrounding the body with a ring-shaped pre-assembly of belt plies and tread and expanding the body into it. In other embodiments of the construction process, the tread and belts are applied to the tire body after it has been pre-shaped. In certain embodiments of tire assembly, the shaping and turn-up process is done through the use of pneumatic bladders. In other embodiments these processes can be accomplished with mechanical, non-pneumatic means such as mechanical fingers.

After the application of the tread/belt assembly the green tire is transferred to the press where it is molded and cured into the final tire. As noted above, the spliceless, seamless tire bodies of this invention form green tires which are particularly amenable to the modern, efficient bladderless curing because of the absence of innerliner seams.

In some embodiments of the invention, the AGS is formed by coextrusion with the body ply and sidewalls as part of the tubular extrudate. In other embodiments, it is formed separately and combined with the tubular extrudate on the tire assembly drum. In the latter case it is possible to combine the AGS with a supplement sidewall piece, particularly where the use of decorative sidewall features is contemplated. Thus, a separately extruded element is formed with an AGS section and one or more supplement sidewall sections.

The supplemental sidewall section may be employed in a low turn-up construction to cover the bead filler with a softer, more flexible rubber stock. In that case, it may be composed of a conventional sidewall compound. alternatively, if the production of tires with decorative features such as white stripes is contemplated, the supplement sidewall piece may be made from a non-staining stock. In such a compound, the rubbers are chosen such that staining chemicals normally added to sidewall compounds to protect them from deterioration during normal service can be reduced or totally eliminated. Such chemicals (for example, antiozonants, etc.) would normally tend to migrate into an adjacent white sidewall stock and produce an unsightly stain. The decorative sidewall feature added to the tire of this invention during its construction, its molding or as part of a post-treatment of the cured tire, will, as a result of the use of a non-staining stock for the supplement sidewall section, not stain during the normal service life of the tire.

Non-staining sidewall rubber stocks suitable for use as $R_1$ compositions typically are comprised or consist essentially of rubbers in the percentage (by weight) ranges:

(a) halogenated (chlorinated or brominated) IIR or other air impermeable rubbers, 30–70%;
(b) EPDM rubber, 0–40%;
(c) high tack and green strength rubber selected from the group consisting of NR, cis BR, hydrogenated high vinyl—BR and mixtures thereof, 20–60%.

The non-staining stock can also contain non-rubber components such as conventional, non-staining compounding ingredients comprising carbon black, processing oils and aids, tackifying resins, curing agents, accelertors and optionally, filament adhesion promoters. Non-staining antidegradants can also be used. Such materials are known to the art and often are based on hindered phenol-type antioxidants and -oxonants. A detailed listed of antidegradants (also known as protective materials) appears in "Blue Book—1986," published by Rubber World magazine. A. Lippincott & Peto publication, 1867 World magazine. A. Lippincott & Peto publication, 1867 West Market Street, Akron, Ohio, USA (1986), pages 130–176. Specific examples of non-staining materials are: 2,2'-methylene bis(4-methyl-6-tertiary-butyl phenol); hindered bis phenol (Naugawhite Powder—Uniroyal); alkylated phenol (Nevastain 21—Neville Chemical); 4,4'-butylidene bis(6-tertbutyl metacresol:oxi-chek 414-Ferro); methylmercaptobenzimidazole (Rhenogram MMBI-70-Rhein Chemie) and the like. These materials are present in their effective amounts as known to those in the art, typically about 0.2 to 5 or as high as 10 percent (by weight) of the rubber stock.

Conventional tire sidewall rubber stocks typically have a rubber composition comprising the following types of rubbers in the percentage (by weight) ranges:
NR, 20–50%;
BR, 0–60%;
SBR, 30–60%; and
EPDM, 0–30%. Such conventional stocks also usually contain non-rubber components such as those described above. They can also contain antidegradants of the non-staining (such as described above) or "staining" type. Since the latter are normally less expensive than the former they are often used in staining rubber stocks. Examples include amine type antioxidants. Further examples are shown in the aforementioned Blue Book.

A conventional tire body rubber stock typically has a rubber composition within the percentage (by weight) ranges:
NR–50–100%;
BR–30–60%; and
SBR–20–50%.

The abbreviations NR, BR, SBR, EPDM, IIR, etc. are taken from widely accepted ASTM nomenclature and represent natural polybutadiene, styrene-butadiene, ethylene-propylene diene monomer and butyl rubbers, respectively.

Because of their relative cost, it is usually the practice to minimize the use of the non-staining stock to the area where decorative sidewall features are applied. Thus a separately formed piece may contain, in sequence, an AGS section, a supplemental sidewall section made of staining stock, a supplemental sidewall section made of non-staining stock, and possibly a second staining section. Examples of the rubber and additive components of both staining and non-staining stocks are provided below.

Coextruded hollow tubular rubber structures suitable for use in building seamless pneumatic tire body components made by the above process, wherein said structures are comprised of a first continuous, filament reinforced layer of ply of constant or varying wall thickness (R-I) formed by coextrusion of an elastomeric composition, $R_1$, are also within the scope of the invention as are also more complex tubular structures as described above having layers (or zones) R-I, R-II, R-III, etc.

DESCRIPTION OF THE DRAWINGS

The invention may be further understood by reference to the drawings which are included in this specification. These drawings show various specific embodiments of the hollow tubular rubber component in diagramatic form, with longitudinal partial section (FIGS. 1, 4 and 7) perspective (FIGS. 3, 6 and 9) and partial cross sections of partially assembled tires shaped to correspond to the final tire (FIGS. 2, 5 and 8). Also presented in diagrammatic form are the several steps used in assembling a pneumatic tire body component according to the present invention (FIG. 10). It will be understood that strict adherence to the detailed disclosure of this application, including the drawings, is not essential to practice of the invention and that changes, modifications, and improvements apparent to those with skill in the art can be made therein without departing from the basic principles of the invention.

Figure 1:
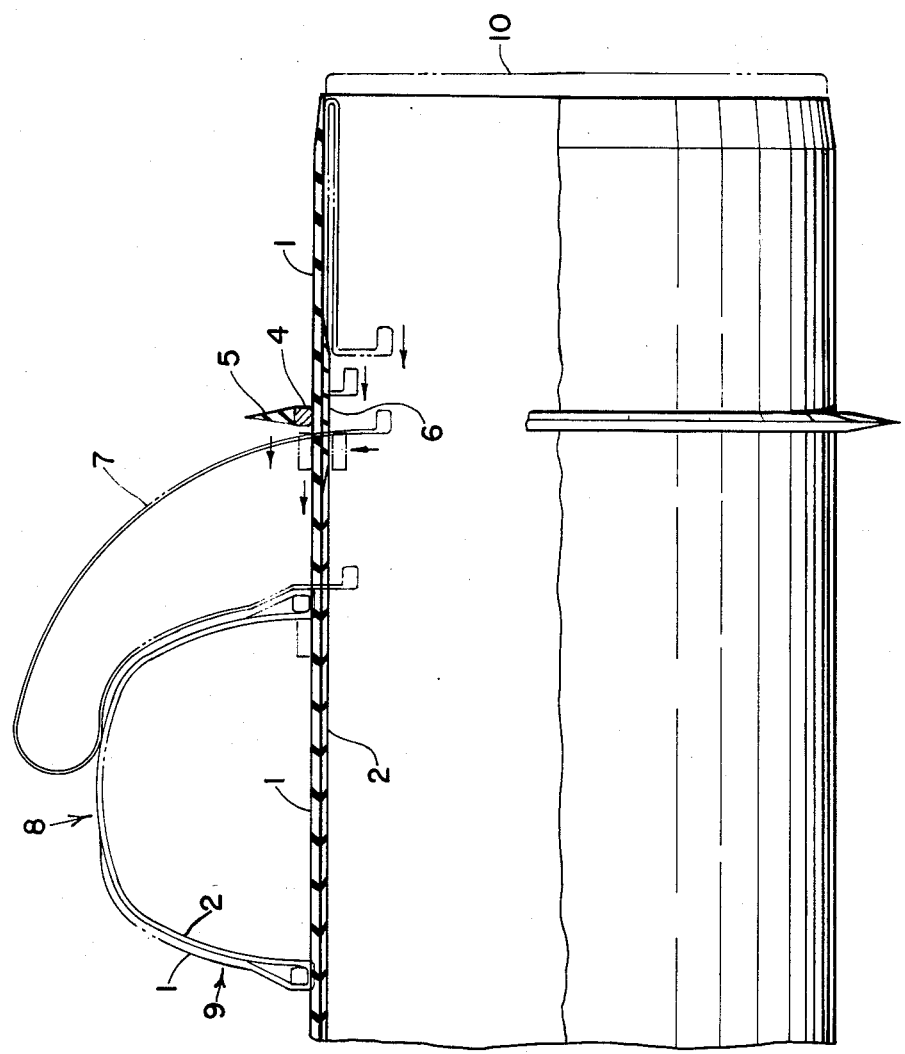

IN THE DRAWINGS:

FIG. 1 is a partial longitudinal section view of the hollow tubular coextrudate structure of this invention, mounted on a tire building drum (10) and fitted against a turnup bladder (7). The extruded component is composed of two layers or plies, a filament reinforced body ply R-I (1) and an innerliner ply R-II (2). In addition there is an abrasion gum strip (6) which, as explained above, can be either separately formed or coextruded together with R-I and R-II. It is positioned as shown on the interior of the tubular component and in the instance where it is made separately, it is first applied to the drum 10. The bead assembly comprised of bead filler (5) with bead wire (4) (again formed separately) is positioned as shown on the exterior of the coextrudate. The undertread (crown) (8) and sidewall (9) areas of the tire are also shown. There is no separate sidewall layer in the embodiments shown in FIGS. 1, 2, 3, 4, 5 and 6. Such a separate layer (3) appears in FIG. 7.

Figure 2:
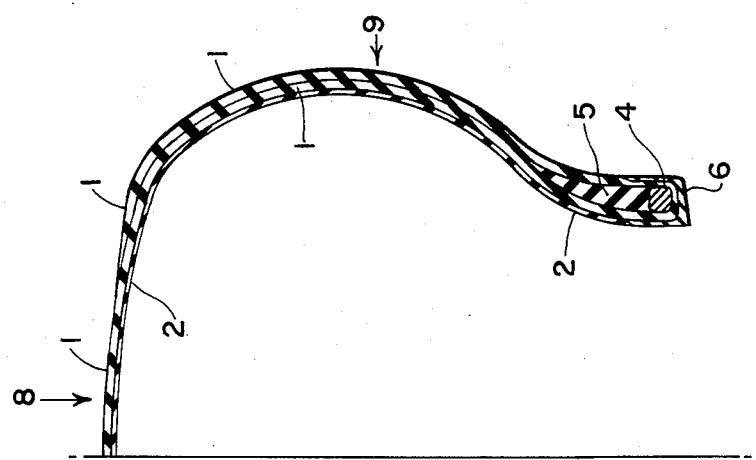

FIG. 2 shows the toroidally shaped tire body in partial (50%) cross section as it will appear in the finished tire following use of the turn-up bladder (7), expansion, subsequent application of belt and tread components and finally molding and curing. The belt and tread components are not shown in FIGS. 2, 5 and 8 to emphasize the features of the tire body section. The areas (8) and (9) are the undertread (crown) and sidewall areas, respectively. FIG. 2 also shows the filament reinforced body ply R-I (1), the innerliner ply or layer R-II (2), the AGS (6), the bead filler (5), and the bead wire (4). As noted above, when the compositions of R-I and R-II are substantially the same the phase boundary between them may merge and disappear and the components (1) and (2) are more appropriately termed zones.

The tire body shown in FIG. 2 represents an ultra high turn-up type of construction where the body plies (1) are turned up around the bead assemblies and brought up very high to the crown area. Constructions similar to that shown in FIG. 2 using high or low turn-up where the body plies reach only partially up the sidewall area (9) can be made and are also within the scope of the invention.

Figure 3:
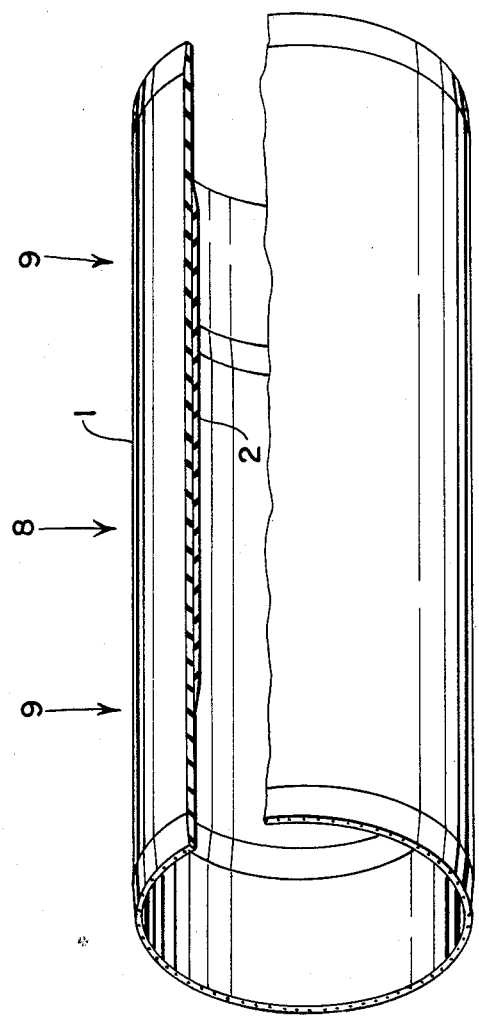

FIG. 3 is a perspective view of the extruded hollow tubular coextrudate after sectioning and prior to placement on the tire building drum. The extrudate is comprised of the filament reinforced body carcass ply or layer R-I (1) made of composition $R_1$ and the innerliner ply or layer R-II (2) made of composition $R_2$. (Wherein $R_1$ and $R_2$ may be different or the same rubber composition). In a less complex embodiment as described below the separate innerliner layer R-II (2) would be omitted and the composition $R_1$ chosen so the ply R-I (1) could function also as innerliner, ply and sidewall. In this embodiment $R_1$ would be chosen to be a unistock as described below.

Figure 4:
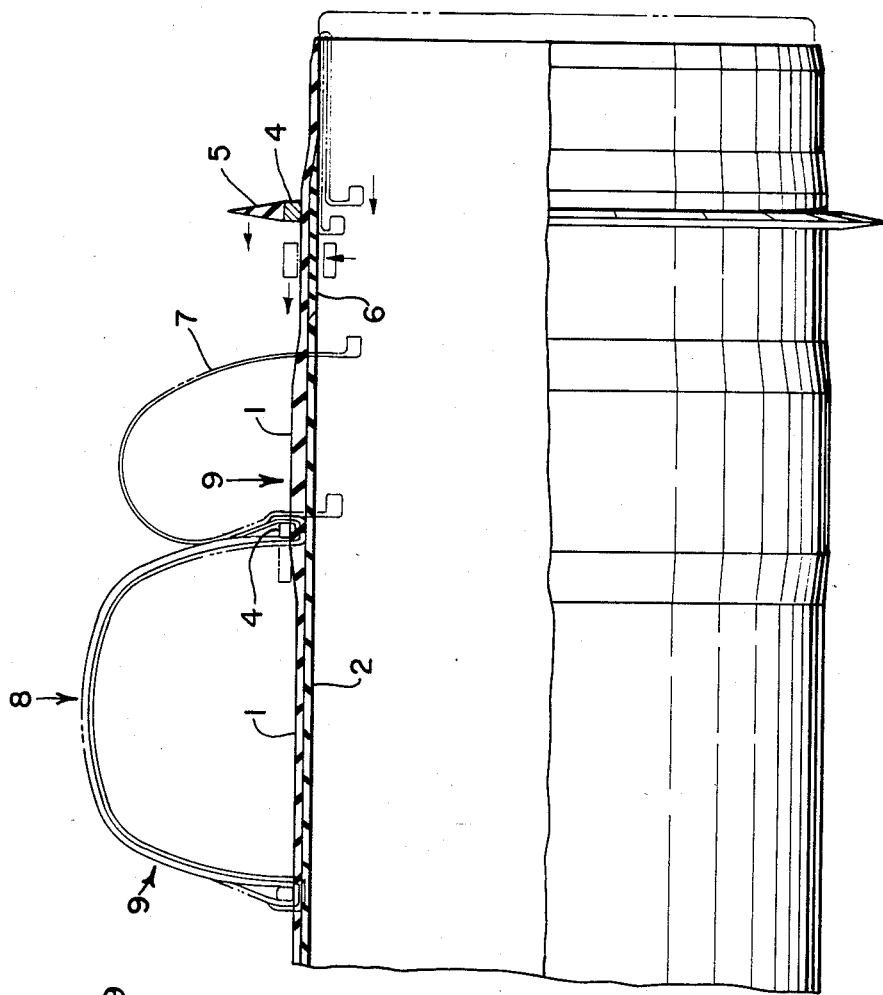

FIG. 4 shows a mounted extruded component similar to that in FIG. 1 except that the coextruded filament reinforced body ply R-I (1) is of varying thickness wherein the sidewall area (9) is thicker than the undertread area (8). This is accomplished by profiling the outside thickness of the coextrudate. Again, the AGS (6) and supplement sidewall sections can also be coextruded or applied individually as described above. There is also present an extruded innerliner portion (2) and separately applied bead assembly comprised of bead filler (5) and bead wire contained therein (4). Again, the tire turn-up bladder (7) folds a portion of the reinforced body ply into the sidewall portion and expansion of the drum in the conventional manner results in formation of the toroidally shaped tire body. In FIG. 4, the turn-up bladder (7) is shown schematically. In actual practice there may be two or more bladders of varying sizes and shapes as is known to those of skill in the art.

Figure 5:
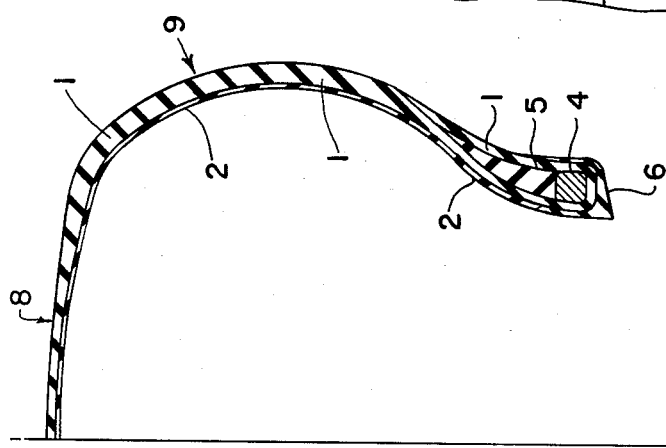

FIG. 5 shows a cross section of the tire body formed from the tubular rubber structure shown in FIG. 4 shaped as it will appear in the finished tire. The varying thickness of the tire body R-I (1) as well as the innerliner R-II (2), bead filler (5), AGS (6) are also shown. The increased thickness of the sidewall area (9) is apparent. With appropriate design of the area (9) it is possible to eliminate the need for a separately formed stabilizer ply insert (SPI). This technique simplifies construction and makes tire production more efficient and uniform. The construction shown in FIG. 5 is of the high turn-up type where sufficient body ply is turned up around the bead assembly to reach up a substantial portion of the sidewall. A similar low turn-up construction is also within the scope of invention.

Figure 6:
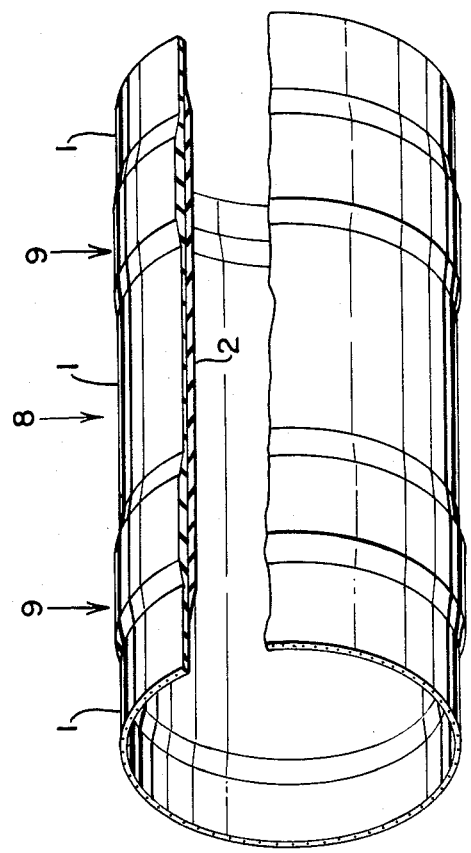

FIG. 6 is a perspective view of a hollow tubular rubber co-extrudate corresponding to the coextruded structure shown in FIG. 4. Again, the thickened sidewall area (9) comprised of the filament reinforced body ply R-I (1) and the innerliner R-II (2) are apparent. Again, in a less complex embodiment of the invention, the innerliner ply is not needed and the body ply R-I (1) serves its function. In this latter embodiment, the rubber composition $R_1$, is appropriately chosen as described below.

Figure 7:
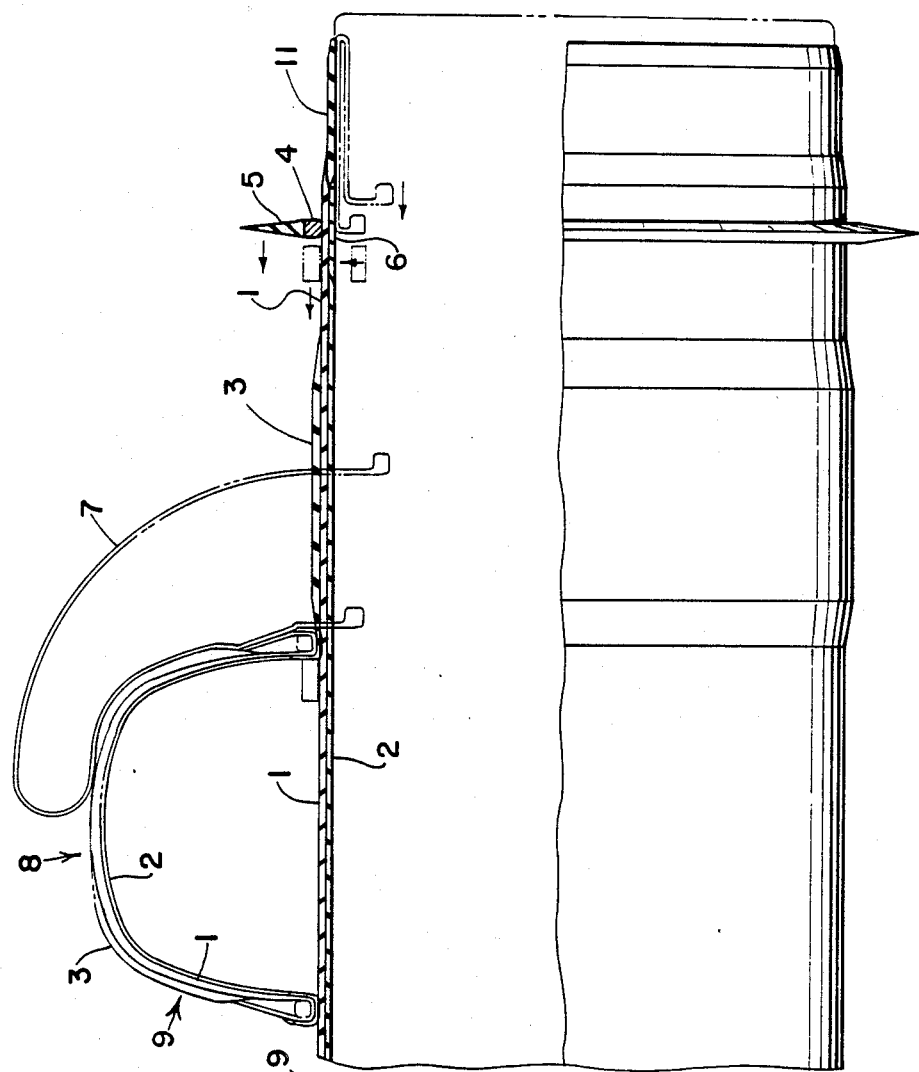

FIG. 7 shows still another embodiment of the present invention wherein the coextruded hollow structure is mounted on a tire building drum. This hollow structure comprises a coextruded filament reinforced ply R-I (1), innerliner ply R-II (2), extruded sidewall portion R-III (3), as well as the AGS (6), bead filler (5) and bead wire (4). As in the aforedescribed embodiments again the turn-up bladder (7) turns up part of the hollow coextrudate and expansion of the drum forms toroidally shaped tire body which requires addition of the tread/belt assembly to produce a completed green tire ready for molding and curing.

Figure 8:
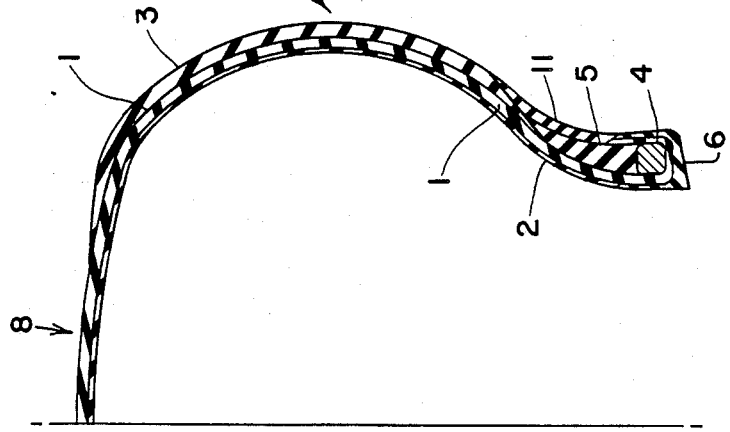

FIG. 8 shows a partial (50%) cross section of the tire body formed from the hollow tubular structure depicted in FIG. 7 shaped to conform to that of the final tire. The tire body ply R-I (1), the innerliner ply R-II (2), bead assembly (4) and (5), AGS (6) and separately formed sidewall portion R-III (3) are shown in their final positions. A supplemental sidewall section (11) is also shown. This section is positioned to protect the bead assembly (4) and (5) from its exterior side. The tire construction shown in FIG. 8 is of the low turn-up type wherein the body ply (1) is turned around the head assembly and only reaches up a small distance of the exterior sidewall. In this case, it may be useful to cover at least a portion of the otherwise exposed bead section with a supplemental sidewall piece (11).

Figure 9:
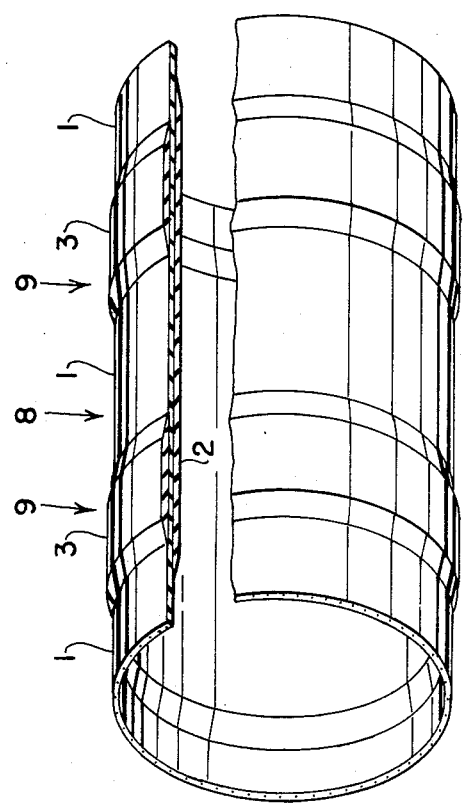
Figure 10A:
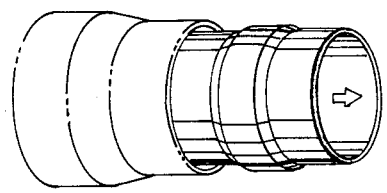
Figure 10B:
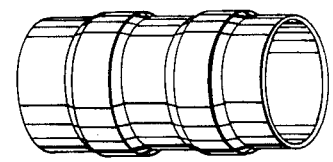
Figure 10C:
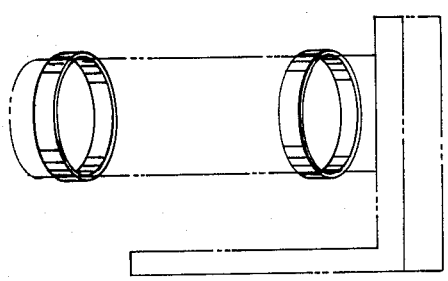
Figure 10D:
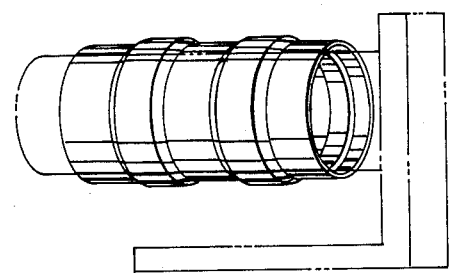
Figure 10E:
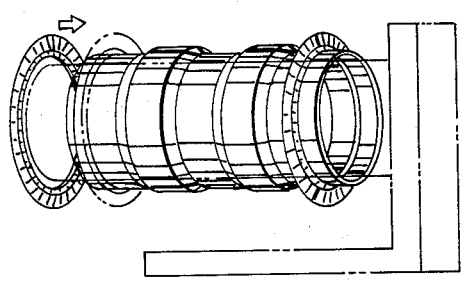
Figure 10F:
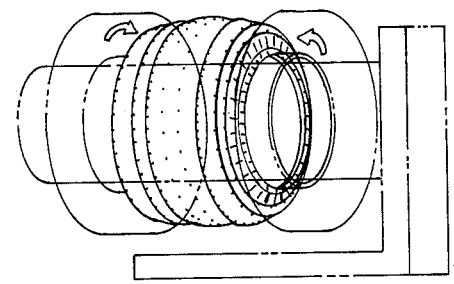
Figure 10G:
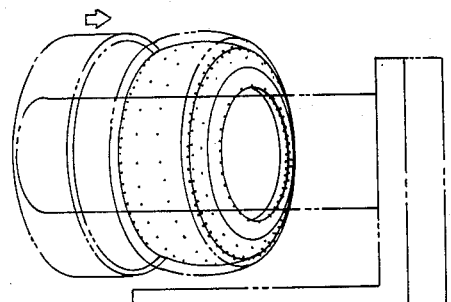
Figure 10H:
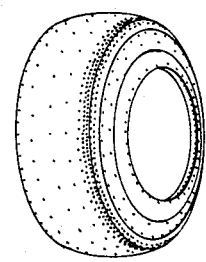

FIG. 9 is a perspective view of the hollow tubular coextrudate formed by coextrusion which corresponds to that shown in FIG. 7. Apparent are the filament reinforced tire body ply R-I (1), the innerliner ply R-II (2), and the coextruded sidewall portion R-III (3). In the embodiment depicted in FIGS. 7-9 the body ply, R-I, innerliner, R-II and sidewall, R-III, layers are made from different rubber stocks. The supplemental sidewall section (11) is made from R-III stock or a stock of similar composition as described below.

FIG. 10 is a diagrammatic presentation of the various steps used in practice of the invention. 10A shows coextrusion of the hollow tubular rubber structure which is shown in 10B after sectioning. 10C depicts positioning of the separately formed AGS on a tire assembly drum as practiced in certain embodiments and 10D depicts positioning of the extruded hollow structure shown in B on the drum over the AGS. In FIG. 10E, the bead assemblies containing bead wire are positioned over the hollow tubular coextruded structure and FIG. 10F depicts operation of the turn-up bladders wherein part of the hollow component is turned over to form the unexpanded tire body which is shown in FIG. 10G. The hollow tubular structure in its turned up position can then be expanded to produce a toroid shape. This expansion can occur either during the turn-up process or shortly thereafter. The beads may move inward to facilitate formation of the desired shape. The expansion may also take place into a ring-shaped tread/belt assembly positioned around the body. Alternatively, the tread and belt components may be added later to the shaped tire body. After placement and stitching down of the tread and belt assemblies the green tire is ready for molding and curing. FIG. 10H depicts the completed green tire body. Suitable equipment and techniques for carrying out these processing steps are known to those of skill in the art; see, for example, U.S. Pat. No. 4,230,517 to Enders which is incorporated by reference for its disclosures relative to tire assembly machines, especially bladders, and their use.

DETAILED DESCRIPTION OF THE INVENTION

The coextruded spliceless rubber tire bodies of this invention are made from filament reinforced tubular structures having no splices or seams which are produced by coextruding a generally hollow tubular shaped rubber structure or coextrudate from one or more concentric tubular streams of at least R-1, having filament reinforcement made from steel, glass or polymeric material spaced in a desired configuration, usually enclosed in the wall of the structure. Said filament reinforcement is parallel and coaxial with coextrudate's main axis. Apparatus means and techniques for accomplishing such coextrusions are known; see, for example U.S. Pat. No. 4,578,024, to Sicka and Tompkins. The '024 patent is hereby incorporated by reference for its disclosure of coextrusion, apparatus means and techniques. The apparatus described in '024 is modified suitably to provide means for varying wall thickness (gauge) and allow for intermittent extrusion of auxiliary layers to the basic coextrudate R-I (pulsing) in practice of the present invention. Such a modified apparatus permits simultaneous coextrusion of two or more plies or layers for providing the basis of such tire structural elements as innerliners, sidewalls, optionally the AGS and the like. These components may vary in wall thickness and placement of the various plies or layers relative to each other and in some instances intermittent extrusion may be used. One method of achieving such modifications is to include means for varying the extrusion die opening in a controlled manner and to vary the feed rate of rubber to the heads as desired. For example, an extruder head with suitably shaped dies is fitted with one, two, three or more extruders fed by rubber stocks R-I, R-II, R-III etc. as desired. Flow channels permit direction of the stocks as required and cord guide systems direct placement of the reinforcing filaments in desired configuration. The die elements permit controlled opening of the gaps through which the individual stocks are extruded. The shape of the extruder head, the number of extruders and their placement relative to the head will vary depending on the particular coextruded structure being made and its complexity. If desired, the amount and rate of rubber extrusion can be controlled in conjunction with the rate of extrusion of the main body ply R-I so as to vary the thickness and placement of the additional plies R-II, R-III etc.

The composition of rubbers $R_1$, $R_2$, $R_3$, etc. used to feed the above-described coextrusion apparatus used in forming the seamless tubular tire bodies of this invention can either be typical of the compositions used in conventional tire construction to form analogous components such as body plies, sidewalls, and innerliner plies and the like or they may be specially adapted compositions for use in particular modifications of the processes of this invention. In one such embodiment of this invention, a single rubber composition is used to form two or more tire components such as a body ply R-I, the innerliner, R-II, and sidewall portion, R-III. This single composition, called a unistock, is adapted to function satisfactorily in several, typically three or more tire structural elements. In addition, the unistock is designed to adhere satisfactorily to the cords used to reinforce R-I. A typical such unistock composition, $R_1$, is a non-staining rubber composition comprised of rubbers in the following percentage (by weight) ranges:

(a) halogenated butyl or other air impermeable rubber, 30–70%
(b) EPDM rubber, 0–40%
(c) high tack and green strength rubber selected from the group consisting of natural rubber, cis-polybutadiene, hydrogenated high vinyl-polybutadiene and mixtures thereof, 20–60%.

Conventional reinforcing agents such as carbon black, silica, treated clay (typically in an amount of about 30–120 parts by weight per hundred parts by weight rubber, phr) and the like as well as other adjuvants such as accelerators, antidegradants and curing agents are also included in the unistock formulation along with suitably chosen chemical additives to promote adhesion of the stock to the filament reinforcement. Such additives are well known to those of skill in the art as are techniques for their use, see, for example "The Vanderbilt Rubber Handbook", published by R. T. Vanderbilt Company, Inc., Norwalk, Conn. 06855, USA (1978), especially pages 645–657, and "Mechanics of Pneumatic Tires," Samuel K. Clark, Editor, U.S. Dept. of Transportation (National Highway Traffic Safety Administration), Washington, D.C. 20590 (1985), especially pages 37–203, which are both incorporated by reference for their disclosures in this regard.

In other embodiments of the invention, different rubber compositions, each specially adapted to function satisfactorily in separate structural tire elements are used as feed stocks for coextrusion to produce the body ply R-I, innerliner R-II, sidewall R-III and other tire components. For example, when decorative white sidewalls are desired, a non-staining sidewall stock can be used in conjunction with other techniques by which the decorative sidewall feature can be applied. Such techniques are used either during the tire molding and curing process or after it on the cured tire; see, for example copending, commonly assigned U.S. patent application Ser. Nos. 766,388, 766,228 and 766,227. These may be varied and combined in such ways as will produce the tire by the most efficient and satisfactory means and to impart the optimal performance. Thus, a given stock can be used for the body and sidewall ply and another for the innerliner ply. Alternatively, specially adapted different stocks can be used for each portion of the tire. For example, when a common stock is used for the body ply R-I/sidewall ply R-III plies of the tubular coextrudate structure of this invention, the composition will generally resemble a conventional sidewall rubber stock with chemical additives included to improve the ability of the stock to adhere to the filament reinforcement. Such rubber adhesion promoters are known to the art such as the cobalt and nickel salts and complexes used to increase rubber to metal cord adhesion. As noted, other chemicals are known which promote adhesion of rubber to yarns or cords made of polymeric materials such as nylon or polyester.

As will be apparent to those of skill in the art through the practice of this invention, the number of stocks required to produce a complete tire can be substantially reduced over those required in conventional tire production wherein individual stocks are used for each component. Thus, using the present invention, it is possible to manufacture tire bodies using one, two, three or at the most, four stocks, whereas tires made by conventional construction techniques may require five or even more different stocks. The advantages in economy and manufacturing logistics that are gained by reducing the number of different stocks required in a tire production unit are obvious to those of skill in the art.

As noted above, the sequence of events used in constructing a green tire according to process of this invention is presented in diagrammatic form in FIG. 10 as described above. In the first step (10A) the tubular tire body component comprising the chosen tire body and sidewall component is extruded. This is sectioned to form the structure shown in 10B which is then mounted on a tire building drum over abrasion gum strips suitably positioned 10C on the interior of the tubular component (10D). The bead assemblies are then set in position over the tubular component at both ends thereof (10E). Turnup bladders in the tire assembly machine inflate to turnup the ends of the tubular coextrudate, folding the end towards the center of the structure and encasing the bead assembly (10F).

High, ultra high or low turn-up configurations can be used. In the former, a double-layered reinforced sidewall is formed not unlike that normally found in 2-ply tires. The use of such bladders is well known to those of skill in the art and the bladders may be used singly or in an array containing two, three or more bladders. The green tire is then expanded to the desired toroidal shape (10G) and, after addition of a suitable individually formed tread/belt assembly, finally removed for transport (10F) to curing molds.

TABLE

| Embodiment | Number of Layers in Co-Extruded Composite | Number and Type of Rubber Stocks Used in Composite | Conventional Tire Components Replaced in Composite[1] | Components Separately Added to Tire Building Drum[2] | Tire Construction Technique | Figure |
|---|---|---|---|---|---|---|
| A$_1$ | 1 | R$_1$ | Ply, SW, IL, SPI | AGS** | low, high or ultra high turn-up | — |
| A$_2$ | 2 | R$_1$ and R$_4$* | Ply, SW, IL, SPI AGS | — | | — |
| B$_1$ | 2 | R$_1$ and R$_2$ | Ply, SW, IL, SPI | AGS** | ultra high turn-up, high turn-up | 1–3 4–6 |
| B$_2$ | 3 | R$_1$, R$_2$ and R$_4$* | Ply, SW, IL, SPI, AGS | — | low to ultra high turn-up | — |
| C$_1$ | 3 | R$_1$, R$_2$ and R$_3$ | Ply, SW, IL, SPI | AGS** | low turn up | 7–9 |
| C$_2$ | 4 | R$_1$, | Ply, SW, | — | low to | |

TABLE-continued

| Embodiment | Number of Layers in Co-Extruded Composite | Number and Type of Rubber Stocks Used in Composite | Conventional Tire Components Replaced in Composite[1] | Components Separately Added to Tire Building Drum[2] | Tire Construction Technique | Figure |
|---|---|---|---|---|---|---|
| | | $R_2$, $R_3$ and $R_4$* | IL, SPI, AGS | | high turn-up | |

*$R_4$ could be identical to or different from $R_1$ or $R_2$ or $R_3$;
**The AGS could be fiber reinforced and may be combined with an additional rubber layer which would serve as sidewall or a carrier for a decorative colored sidewall feature. This additional layer may be composed of one or more stocks combined by similar extrusion or by an assembly of different parts.
[1]Ply = Filament reinforced body ply
SW = Sidewalls
SPI = Stabilizer Ply Insert
IL = Innerliner or air barrier
AGS = Abrasion Gum Strip
[2]In addition to tread and belt or an assembly of both and bead assembly (usually comprising bead ring and bead filler)

The invention may be further understood from a consideration of several embodiments of varying complexity. These embodiments are summarized in the Table wherein are shown: the particular embodiment type denoted with a letter, the number of layers (or zones) present, the number of stocks used in the coextruded structure, the conventional tire components replaced by the composite structure listed, the additional, individually formed structural elements required (in addition to the tread/belt and bead assemblies), the tire construction technique preferred, and the figure reference, if any.

For example, in embodiment $A_1$ of the invention, a coextrudate is formed from a single rubber stock $R_1$, which comprises a hollow tubular structure of constant or variable gauge with reinforcing filaments in zone R-I and having portions that upon shaping of the tire body will assume the function of body ply, sidewall, innerliner, and the SPI. In embodiment $A_1$, the only conventional structural element needed to be added is the AGS.

In embodiment $A_2$, a single rubber composition $R_1$, is used to form a filament reinforced tubular coextrudate, having zones which function in the finished tire as the body ply, sidewall, SPI and the innerliner. In contrast to embodiment A-1, the AGS is formed from stock R-4 adapted for this purpose is coextruded with $R_1$. In both $A_1$ and $A_2$ low to ultra high turn-up type constructions can be used to form the assembled tire body.

In embodiments $B_1$ and $B_2$ two stocks $R_1$ and $R_2$ are used to form all layers except for the AGS in $B_2$. In $B_1$, the AGS is added separately after coextrusion. The body ply, sidewall and SPI are formed from $R_1$ and the innerliner from $R_2$. Both high and low turn-up construction techniques can be used. The $B_1$ embodiment depicted in FIGS. 1–3 is of the ultra high turn-up construction and in FIGS. 4–6, of high turn-up construction.

In embodiment $C_1$ and $C_2$ separate stocks are used for each of the body ply and SPI as well as the innerliner and sidewall, namely stocks $R_1$, $R_2$ and $R_3$ respectively. In $C_2$, a fourth stock, $R_4$, is coextruded with the first three to form the coextruded AGS. The $C_1$ embodiment is illustrated in FIGS. 7–9 with a low turn-up type construction.

As explained above, additional variations on the basic concept of the invention can be made, for example, by introducing variations into the use of the AGS. This permits the formation of decorative sidewalls with the use of specially adapted rubber stocks. For instance, strip can be formed in a separate coextrusion process, wherein a portion is comprised of a stock suitable for functioning as the AGS and an adjacent strip portion is of a stock suitable for use as a supplementary sidewall support piece. This latter portion of the strip can include sections made from a staining, blackside wall strip and a section made of non-staining stock wherein the rubbers are chosen such that staining additives usually added for compound stabilization (for example, antiozonants) can be reduced in concentration or totally eliminated. A rubber stock made in this manner will not discolor a decorative white rubber piece bonded to it.

The invention may be still further understood from the following description of specific examples.

DESCRIPTION OF SPECIFIC PREFERRED EMBODIMENTS

The following is a description of the manufacture of several preferred embodiments. These include a description of the currently preferred embodiment and the best mode now contemplated of carrying out the invention.

EXAMPLE I (A) A P195/75 R14 radial passenger tire was hand constructed to test the performance and durability of tires made according to the invention. The structure was essentially shown in FIG. 4 except for the use of a low rather than high turn-up construction. It comprised a profiled body ply/sidewall layer (1) made of conventional sidewall rubber stock of the composition: 65% BR and 35% HR (by weight), modified to include a polyester cord adhesion promoter (Cymel-melamine resin type with a formaldehyde dip system such as described in U.S. Pat. No. 3,318,750), and an innerliner (2) made of halogenated butyl rubber stock. The layer (1) was prepared by calendaring the modified sidewall stock with polyester cord to produce a cord reinforced body ply. Separate sidewall pieces were cut of the required shape and laminated in a three-fold structure to one side of the cord-reinforced body ply to duplicate the profiled outer configuration of the profiled coextruded structure shown in FIG. 4. The body ply/sidewall piece and the innerliner piece were each cut, assembled and spliced on a tire building drum together with AGS and bead assembly elements. A low turn-up construction was used to form the tire body. The addition of steel belts and tread of conventional composition in the usual manner produced, after molding and curing a tire having a body carcass essentially duplicating that which would have been produced by coextrusion according to this invention (with the exception of two splices in the innerliner and body/sidewall layers). The tire carcass in cross section is that shown in FIG. 5, except that a low rather than high turn-up construction was used.

The above analog tire allowed testing and optimization of tire component geometry and composition prior to manufacture of the seamless version of the tire body by coextrusion. Examination by durability and high speed performance tests shows the tire satisfied DOT requirements. The tire was also found acceptable under holographic examination.

(B) A tire was constructed in the same manner as Example I(A) except the body ply/sidewall coextrudate layer was made of a non-staining sidewall stock of the composition: 45% chlorinated IIR; 45% NR; 10% EPDM, containing the aforedescribed polyester cord adhesion promoter. Examination and testing as with I(A) demonstrated the tire satisfied DOT requirements. The results of I(A) and I(B) also showed that the rubber compositions used produce tires with satisfactory performance properties.

(C) A tire was constructed in the same manner as Example I(B) except that the innerliner was also made of the same non-staininng sidewall stock. Testing of the tire showed it performed satisfactorily, thus demonstrating the feasibility of forming a tire carcass having a body ply, sidewalls and innerliner coextruded from the same rubber stock (a unistock).

EXAMPLE II

A structure for forming a tire body as shown in FIG. 2 comprising a polyester cord reinforced body ply, as well as sidewall and innerliner zones all made of a unistock $R_1$ is coextruded. $R_1$ is based on a rubber stock having the composition: 60 parts chlorinated IIR ruber, 10 parts EPDM and 30 parts natural rubber (all parts by weight). The stock contains carbon black (60 phr) and conventional processing aids and curing agents in normal amounts. The coextrudate is of the embodiment $A_1$ type. The tubular structure is mounted on a tire building drum and combined with bead assemblies, AGS's, steel belts and tread plies and transfered to a molding and curing press to produce a 14-inch radial passenger tire meeting DOT requirements.

EXAMPLE III

A coextruded structure is prepared as shown in FIG. 7 having body ply (1), innerliner (2) and sidewall layers (3) of three different stocks corresponding respectively to conventional rubber compositions for body, innerliner and sidewall plies. Separate pieces of AGS and supplemental sidewall strips (made of conventional black sidewall stock) are formed and assembled with the coextrudate structure, the bead assemblies are added and the tire construction is completed in the normal manner with steel belts and tread to provide a green tire having a body in cross section as shown in FIG. 8. This tire is molded and cured in the usual fashion to provide a tire meeting DOT standards.

What is claimed:

1. A method of manufacturing seamless bodies for pneumatic tires comprising the steps of:
   (a) extruding from at least one rubber composition $R_1$ a filament-reinforced seamless hollow tubular structure having areas of varying wall thickness along the length of the extruded filament-reinforced structure said structure having at least one layer R-I with filament reinforcement therein, and said filaments being substantially parallel to the main axis of the tubular structure;
   (b) sectioning the tubular structure in a plane substantially perpendicular to its main axis to form a hollow tubular body component;
   (c) forming separately from the tubular structure a pair of strips made from at least one layer of rubber, said strips serving to form combined abrasion gum strips and supplemental sidewall pieces and positioning the pair of strips on the tire building drum;
   (d) positioning said tubular body component concentrically on a tire building drum equipped with shaping bladders and means of expansion over the pair of strips;
   (e) positioning two bead assemblies comprised of bead wires and bead fillers over the positioned tubular component;
   (f) turning up both ends of the tubular component with said shaping bladders so as to enclose the bead assemblies with a portion of the tubular component at each of its ends; and
   (g) expanding the center of the turned up tubular component so as to form a toroidally shaped pneumatic tire body having a body ply and sidewalls formed from the extruded structure.

2. The method of claim 1 wherein the layer R-I is the only tubular extruded layer present.

3. The method of claim 2 wherein the composition $R_1$ is a non-staining rubber composition comprised of rubbers in the percentage ranges by weight as follows:
   (a) halogenated Butyl Rubber in the amounts of 30–70%;
   (b) Ethylene/Propylene/Diene Monomer Rubber in the amount of 0–40%;
   (c) high tack and green strength rubber selected from the group consisting of Natural Rubber, cis Polybutadiene Rubber, hydrogenated high vinyl Polybutadiene Rubber and mixtures thereof in the amounts of 20–60%;

and the stock also comprises as compounding ingredients carbon black, curing agents, non-staining antidegradants, processing aids and oils, tackifying resins and filament reinforcement adhesion promoters.

4. The method of claim 1 wherein the layer R-I is not the only tubular extruded layer present and the composition $R_1$ is a tire body rubber stock having a rubber composition within the percentage ranges by weight as follows:
   Natural Rubber in the amounts of 50–100%;
   Polybutadiene Rubber in the amounts of 30–60%;
   Styrene/Butadiene Rubber in the amounts of 20–50%.

5. The method of claim 1 wherein the layer R-I is not the only layer present and the composition $R_1$ is a tire sidewall rubber stock having a rubber composition within the percentage ranges by weight as follows:
   Natural Rubber in the amounts of 20–50%;
   Polybutadiene Rubber in the amounts of 0–60%;
   Styrene/Butadiene Rubber in the amounts of 30–60%;
   Ethylene/Propylene/Diene Monomer Rubber in the amounts of 0–30%.

6. The method of claim 1 wherein a second layer R-II is coextruded with R-I, said layer R-II being of a variable wall thickness and being of an innerliner composition $R_2$, said $R_2$ being different from $R_1$, and $R_2$ is comprised of a rubber stock selected from the group consisting of Butyl Rubber, halogenated Butyl Rubber and mixtures thereof, and wherein the tire body formed in step (g) has an innerliner formed from layer R-II.

7. The method of claim 6 wherein a third layer R-III is coextruded with layers R-I and R-II wherein at least part of the sidewalls of the tire body formed in step (g) are formed from layer R-III and layers R-II and R-III are of variable wall thickness.

8. The method of claim 7 wherein layers R-I and R-III are of the same rubber composition $R_1$ and $R_1$ is a staining or non-staining sidewall rubber stock composition comprising a rubber chosen from the group consisting of Natural Rubber, Polybutadiene Rubber, Styrene/Butadiene Rubber, Ethylene/Propylene/Diene Monomer Rubber, halogenated Butyl Rubber and mixtures of two more thereof and also comprising as compounding ingredients: carbon black, curing agents, antidegradants, processing aids and oils, tackifying resins and filament reinforcement adhesion promoters.

9. The method of claim 8 wherein the rubber composition $R_1$ is of the composition:
Natural Rubber in the amounts of 20-50%;
Polybutadiene Rubber in in the amounts of 0-60%;
Styrene/Butadiene Rubber in the amounts of 30-60%;
Ethylene/Propylene/Diene Monomer Rubber in the amounts of 0-30%.

10. The method of claim 8 wherein the rubber composition $R_1$ is a non-staining sidewall rubber stock comprised of rubbers in the following percentage ranges by weight:
(a) halogenated Butyl Rubber in the amounts of 30-70%;
(b) Ethylene/Propylene/Diene Monomer Rubber, in the amounts of 0-40%;
(c) high tack and green strength rubber selected from the group consisting of Natural Rubber, cis Polybutadiene Rubber, hydrogenated high vinyl-Polybutadiene Rubber and mixture thereof in the amounts of 20-60%, and the stock also comprises as compounding ingredients: carbon black, curing agents, non-staining antidegradants, processing aids and oils, tackifying resins and filament reinforcement adhesion promoters.

11. The method of claim 7 wherein layers R-I and R-III are of different rubber stocks $R_1$ and $R_3$, $R_1$ is a body ply stock and $R_3$ is a sidewall stock comprising a rubber chosen from the group consisting of Natural Rubber, Polybutadiene Rubber, Styrene/Butadiene Rubber, Ethylene/Propylene/Diene Monomer Rubber, halogenated Butyl Rubber and mixtures of two more thereof and also comprising as compounding ingredients: carbon black, curing agents, antidegradants, processing aids and oils, and tackifying resins.

12. The method of claim 11 wherein the composition R-I and R-III are of different rubber stocks $R_1$ and $R_3$, $R_1$ is a tire body stock having a rubber composition comprised within the percentage ranges by weight as follows:
Natural Rubber in the amounts of 50-100%;
Polybutadiene Rubber in the amounts of 30-60%;
Styrene/Butadiene Rubber in the amounts of 20-50%;
and $R_3$ is a non-staining sidewall rubber stock comprised of rubbers in the following percentage ranges by weight as follows:
(a) halogenated Butyl Rubber, 30-70%;
(b) Ethylene/Propylene/Diene Monomer Rubber, 0-40%;
(c) high tack and green strength rubber selected from the group consisting of Natural Rubber, cis, Polybutadiene Rubber, hydrogenated high vinyl Polybutadiene Rubber BR and mixtures thereof in the amounts of 20-60%, and the stock also comprises as compounding ingredients, carbon black, curing agents, non-staining antidegradants, processing aids and oils, and tackifying resins.

13. The method of claim 11 wherein the composition R-I and R-III are of different rubber stocks $R_1$ and $R_3$, $R_1$ is a tire body stock having a rubber composition comprised within the percentage ranges by weight as follows:
Natural Rubber in the amounts of 50-100%;
Polybutadiene Rubber in the amounts of 30-60%;
Styrene/Butadiene Rubber in the amounts of 20-50%;
and $R_3$ is a sidewall rubber stock comprised of rubbers in the following percentage ranges by weight as follows:
Natural Rubber in the amounts of 20-50%;
Polybutadiene Rubber in the amounts of 0-60%;
Styrene/Butadiene Rubber in the amounts of 30-60%;
Ethylene/Propylene/Diene Monomer Rubber in the amounts of 0-30%, and the stock also comprises as compounding ingredients, carbon black, curing agents, antidegradants, processing aids and oils, and tackifying resins.

14. A method of manufacturing seamless bodies for pneumatic tires comprising the steps of:
(a) extruding from rubber compositions a filament-reinforced seamless hollow tubular structure having areas of varying wall thickness along the length of the extruded filament-reinforced structure said structure having at least layers R-I, R-II, R-III and R-IV wherein said filament reinforcement is in layer R-I, and said filament being substantially parallel to the main axis of the tubular structure and said layer R-IV is of an abrasion gum strip stock;
(b) sectioning the tubular structure in a plane substantially perpendicular to its main axis to form a hollow tubular body component;
(c) positioning said tubular component concentrically on a tire building drum equipped with shaping bladders and means of expansion;
(d) positioning two bead assemblies comprised of bead wires and bead fillers over the positioned tubular component;
(e) turning up both ends of the tubular component with said shaping bladders so as to enclose the bead assemblies with a portion of the tubular component at each of its ends; and
(f) expanding the center of the turned up component so as to form a toroidally shaped pneumatic tire body having a body ply and sidewalls formed from the extruded structure and the body has an abrasion gum strip around each bead wire assembly formed from said layer R-IV.

* * * * *

UNITED STATES PATENT AND TRADEMARK OFFICE
CERTIFICATE OF CORRECTION

PATENT NO. : 4,776,909
DATED : October 11, 1988
INVENTOR(S) : Bohm et al.

It is certified that error appears in the above-identified patent and that said Letters Patent are hereby corrected as shown below:

Col. 4, line 25

After zone, insert -- R-I and a non-reinforced --

Col. 6, lines 28 & 29

Delete "1867 World magazine. A Lippincott & Peto publication,"

Col. 7, line 13

"layer of ply" should be -- layer or ply --

Col. 15, line 38

"ruber" should be -- rubber --

Signed and Sealed this

Seventh Day of March, 1989

Attest:

DONALD J. QUIGG

*Attesting Officer*    *Commissioner of Patents and Trademarks*